United States Patent [19]

Townsend

[11] Patent Number: 4,909,658
[45] Date of Patent: Mar. 20, 1990

[54] BULL ROPE RELEASE

[76] Inventor: Blue H. Townsend, 141 Ramblewood Dr., Bartlesville, Okla. 74003

[21] Appl. No.: 318,741

[22] Filed: Mar. 3, 1989

[51] Int. Cl.$^4$ .................... A44B 13/00; F16G 11/00
[52] U.S. Cl. .................... 403/325; 403/316; 403/322; 403/321; 403/330; 24/241 PP; 24/241 SB; 24/242; 24/115 F
[58] Field of Search ............... 403/316, 321, 322, 325, 403/330, DIG. 4; 24/645, 115 F, 241 PP, 241 SB, 242, 599; 292/78, 96, 126, 129, 106; 89/1.58; 410/96, 116

[56] References Cited

U.S. PATENT DOCUMENTS

| | | | |
|---|---|---|---|
| 1,190,383 | 7/1916 | Court | 403/330 X |
| 2,328,914 | 9/1943 | Kubat | 403/DIG. 4 |
| 2,821,003 | 1/1958 | Boyes et al. | 24/645 |
| 4,533,276 | 8/1985 | Stidham | 403/165 |
| 4,820,094 | 3/1989 | Hirakui et al. | 403/322 X |

OTHER PUBLICATIONS

Pro Rodeo Products 1988 Catalog, p. 15.

*Primary Examiner*—Randolph A. Reese
*Assistant Examiner*—Franco S. DeLiguori
*Attorney, Agent, or Firm*—John D. Gassett

[57] ABSTRACT

A quick safety release for bull ropes and bare back riggings. One ring on the bull rope is held to the release device by a first ring latch which is pivoted to a release frame. A pivoted spring-loaded latch arm which in its normal position is perpendicular to the ring latch holds the ring latch in position preventing it from rotating about its pivot. A release line or cord is connected to the latch arm. When the bull rider pulls the release line the latch arm is pulled away from the ring latch permitting it to come unlatched from the ring of the bull rope.

4 Claims, 2 Drawing Sheets

BULL ROPE RELEASE

DISCLOSURE STATEMENT

The closest prior art of which I am aware is the "Flank Trips" sold by PRO Rodeo Products and is shown on page 15 of Pro Rodeo Products 1988 Catalog. A copy of that page is enclosed. The releasing mechanism of that product is entirely different from my "Bull Rope Release".

BACKGROUND

This invention relates to a safety device for rodeo performers such as bull riders and bronco riders.

One of the large entertainment enterprises in the United States and elsewhere in North America is the rodeo. Bull riding and bare back bronco riding are two of the more popular events with the spectators and also with many riders. However, they are also probably the most dangerous. In riding a bull, the bull rope goes under the body of the bull just behind its front legs. The bull rope comes together on top of the animal and is held together by the rider extending a strap fixed to one end of the bull rope through a ring fixed to the other end of the bull rope. The strap is then wrapped about one hand of the rider who grips the strap as tightly as possible. Then the bull is let out of the chute with the rider on top. Rules require that the rider can hold on only by the hand about which the strap is placed.

For eight seconds the rider holds on for dear life and hopefully prize money if he is still on at the end of the eight seconds. The rider must then dismount. To dismount the rider must free his hand from the strap wrapped around it. This can be, and often is, a problem. This problem can also rear its ugly head when the rider is thrown from the bull before the eight seconds is up. Many a rider has been hurt because he could not free his hand. Rodeo clowns try hard to help any rider who finds himself in such a hazardous position. Even so many such riders are seriously hurt.

Thus, it is clear that there is an urgent need for a device which can be used to keep the rider from getting into this hazardous and frightening position. It is an object of this invention to provide such a device.

SUMMARY OF THE INVENTION

This bull rope release has a relatively flat base or frame. It has a ring latch with an open mouth at one end and a lock shoulder at the other. This ring latch is pivotally attached to the base by a pivot whose axis is parallel to the plane of the base. The mouth portion of the ring latch extends beyond the base where it can engage the O-ring of the bull rope. The mouth of the ring latch has a forward sloping face so that force on it transmitted by the O-ring of the bull rope will pivot it and free the ring from the ring latch. The ring latch is held in position by a release latch arm pivotally attached to the base and is held by a spring in its normal position where it engages the lock shoulder of the ring latch to hold the ring latch in its normal ring holding position. When in its normal position, the release latch arm is essentially perpendicular to the ring latch when in its normal position. The ring latch pivots in a plane essentially perpendicular to the base whereas the release latch arm pivots in a plane substantially parallel to the base. A pull cord is connected to the release latch arm such that a pull on it will overcome the resistance of the spring and pivot the release latch arm away from the lock shoulder of the ring latch. On the bottom or underneath side of the base is a D-ring hook and keeper spring.

In use, the D-ring fixed to a first rope section of the the bull rope is secured in the mouth of the D-ring hook on the underneath side of the base. A rider's holding strap is attached to the ring held by the ring latch. The bull rope is wrapped around the bull. Next, the rider's holding strap is inserted through a ring connected to a second end of the first rope portion. This ring of the holding strap is held to the release device by the ring latch. Then the rider tightens and secures the holding strap in the normal manner. The release cord is secured to the bull rope such that it can be readily reached by the free hand of the rider. When the rider is ready to dismount, he will release his holding strap. If his hand is caught, he merely pulls the release cord with the other hand. This pulls the latch arm away from the lock shoulder of the ring latch. This permits the ring latch to pivot releasing the ring on the bull rope. The bull rope is now unfastened and the rider is free of the bull.

DETAILED DESCRIPTION

Figure 1:
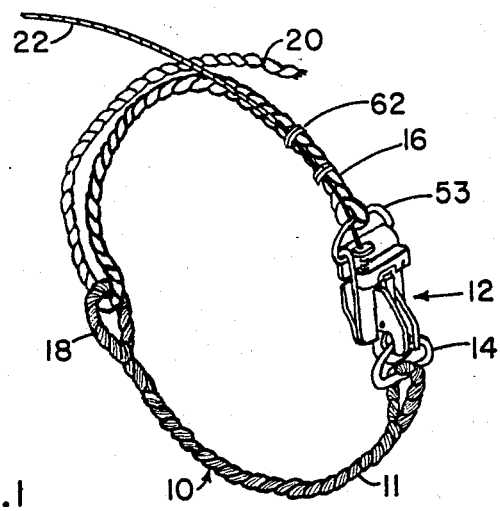
FIG. 1 is an isometric view showing my safety release connected into a bull rope.

Attention is first directed to FIG. 1 which shows a bull rope 10 with my safety bull rope release 12 connected therein. The release is shown in its operation position holding ring 14 in place. Ring 14 is secured to bull rope section 11. Rope section 11 has a loop 18 at the end opposite ring 14. Rope section 16 is secured at one end to the safety release 12 in a manner shown in FIG. 1. The other end of rope section 16 extends through loop 18 and has a flat section 20 which the bull rider wraps about one hand. A release cord or line 22 extends from the safety bull rope release 12 along the rope section 16 to at least adjacent where the rider's hand is holding the bull rope flat section 20. The release line 22 is loosely secured to the rope section 16 such as by rings 62 so that it can move or slide along section 16 independent of movement or non-movement of bull rope section 16. Rings 62 may be rings or loops secured to rope section 16.

Figure 2:
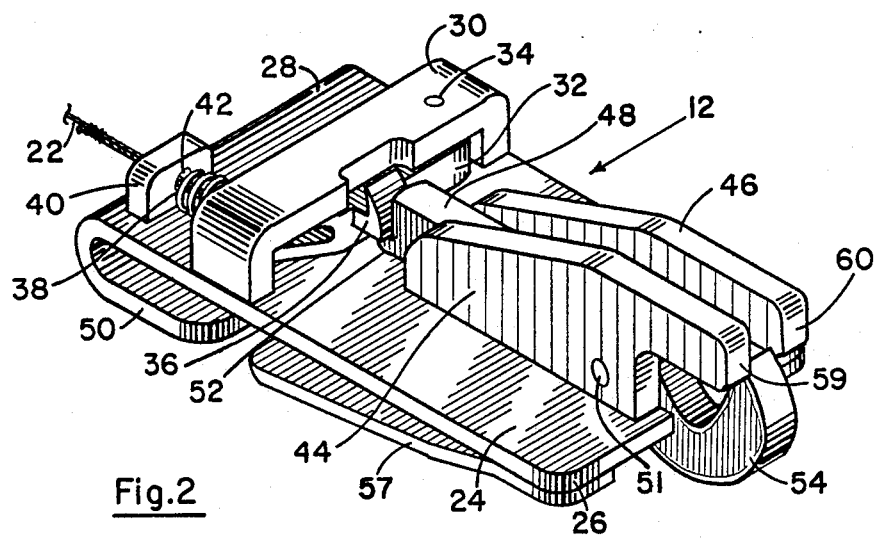
FIG. 2 is an isometric view of my safety bull rope release device.

Attention is next directed to FIG. 2 which is an isometric view of my safety bull release. Shown thereon is flat top plate 24 having a first end 26 and a second end 28. A yoke 30 is secured traversely of plate 24 near end 28. Release latch arm 32 having lock key 36 is pivotally secured by pivot 34 within yoke 30. The axis of pivot 34 is essentially perpendicular to the face of plate 24 so that latch arm 32 can pivot in a plane parallel to the plate 24. A compression keeper spring 38 is mounted between upright support 40 and latch arm 32 to urge it away from support 40 which is secured to plate 24. Release cord 22 extends through hole 42 in the support 40, through the interior of spring 38 to pin 39 which is secured to latch arm 32.

Figure 3:
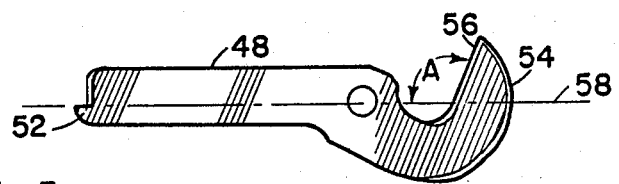
FIG. 3 is a view of the ring latch hook.

Parallel latch pillars 44 and 46 are attached to plate 24 and extend up perpendicular thereto with a space therebetween. A ring latch 48 (shown more clearly in FIG. 3) is attached between pillars 44 and 46 by a pivot 51. Thus, ring latch 48 can pivot in a plane perpendicular to plate 24. One end of latch 48 has a hook 54 which has a mouth for receiving ring 14 (FIG. 1). The face 56 of hook 54 makes an angle A with center line 58 which is preferably between about 91° and about 120°. Making the angle within this range and having the face 56 nearly planar helps get a clean release of ring 14 when release cord 22 is pulled. A hook 54 has been made which has an angle A of 109°.

Figure 5:
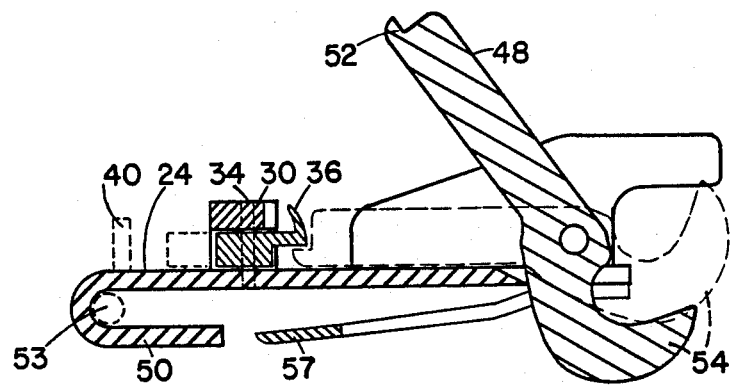
FIG. 5 is a view taken along the line 5—5 of FIG. 3.
Figure 6:
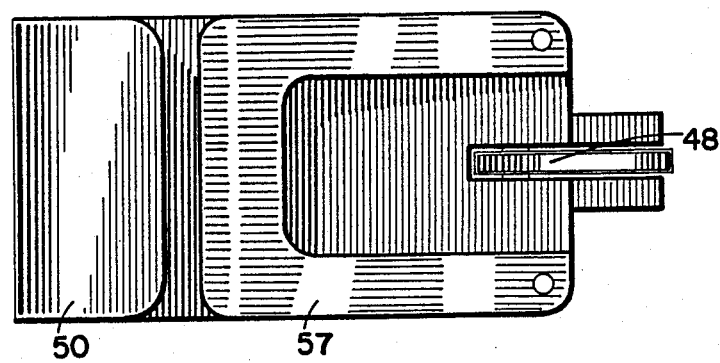
FIG. 6 is a bottom view of my safety bull rope release.

As shown in FIGS. 2, 5 and 6 there is a D-ring receiving hook 50 on the bottom of plate 24 for receiving D-ring 53 which as shown in FIG. 1 is attached to rope section 16.

The D-ring 53 is held in position in hook 50 by keeper spring 57. When spring 57 is depressed, the ring 53 can be inserted through the mouth of the D-ring receiving hook. Spring 57 when released, holds D-ring 53 in place.

The bull rope release unit may be made of any material rigid and strong enough to withstand rough rodeo use. Typically it may be made of steel or molded from high grade aluminum. The spring 38 is preferably made of high quality steel.

Figure 4:
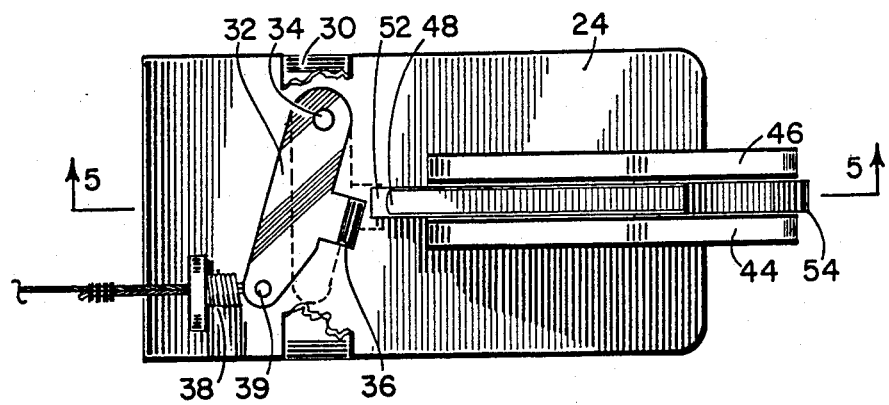
FIG. 4 is a top view of my safety bull rope release with a part of the yoke cut away to better illustrate the release latch arm.

In use, the bull rope release connects rope section 11 to bull rope section 16 through use of ring 14 and D-ring 53 as shown in FIG. 1. The ring latch 48 is in the position shown in FIGS. 1 and 2 and the dotted outline 54 in FIG. 5 where ring 14 is held securely by hook 54 and extensions 59 and 60 of pillar 44 and 46. Lock key 36 of latch arm 48 secures ring arm 48 in the position shown clearly in FIGS. 2 and 5. Spring 38 holds the latch arm in this position so that lock key 36 holds latch arm 48 in, position. D-ring 53 is held by hook 50 and keeper spring 57. Now the bull rope as shown in FIG. 1 is ready to use with the end of rope section 16 extending through loop 18 after the bull rope has encircled the bull. The end of section 16 is then wrapped about the hand of the rider. Release rope 22 is positioned near the rider by "loose" rings 62 through which the release cord may be pulled. The rider then makes his ride. At the conclusion of the ride, either at the end of the required time or when the rider is thrown,, the rider attempts to turn loose from the section of rope wrapped about his hand. Sometimes this is not easy. Prior to my invention, many riders were dragged about on the ground by the bull because the rider could not free his hand. This has resulted in serious injuries. However, with my quick bull rope release all a rider has to do if his hand is caught is to pull release cord 22. Pulling of cord 22 releases lock key 36 from shoulder 52 of latch arm 48. The force of ring 14 on face 56 of hook 54 quickly pivots arm 48 to the position shown in FIG. 4. Ring 14 falls free from the release device and the rope is free of the bull. The rider can then escape and untangle his hand at his leisure. If the situation dictates, rope 22 may be pulled by a rodeo clown.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

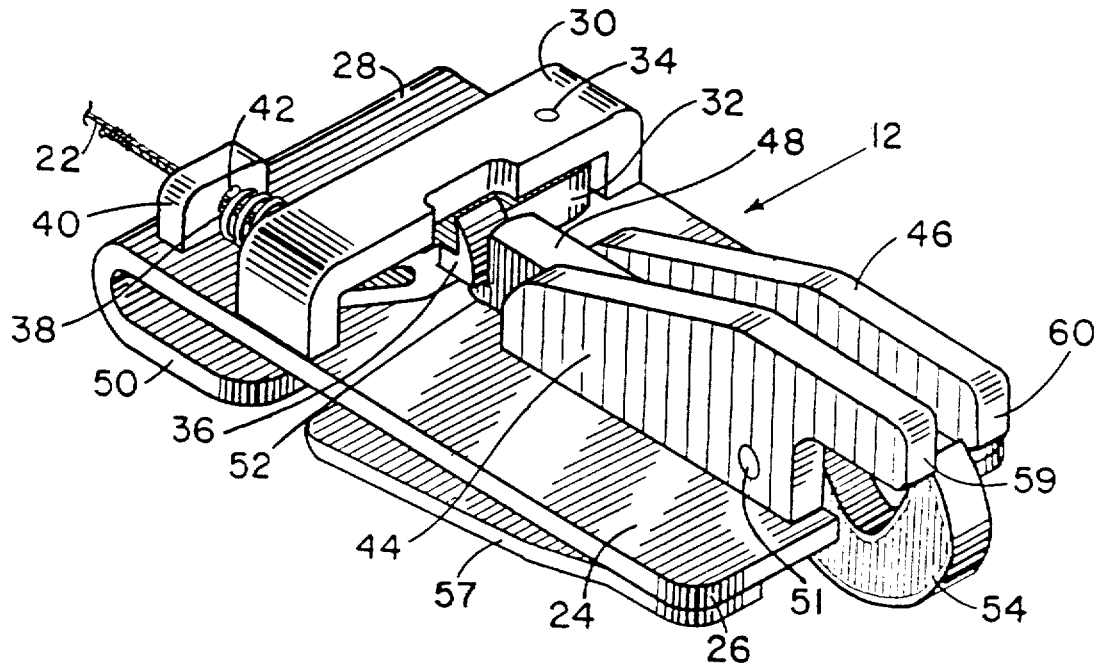

What is claimed is:

1. A bull rope release for use with a bull rope having a ring at one end and a holding strap at the other which comprises:
   a base having a first end and a second end;
   a ring latch pivotally supported from said base to pivot in a plane substantially perpendicular to said base and having an open mouth at one end for fitting over a ring, said ring latch having a lock shoulder at the other end;
   a release latch arm having a lock key and pivotally attached to said base to pivot in a plane substantially perpendicular to the plane on which said ring latch pivots;
   biasing means urging said release latch arm toward the lock shoulder of said ring latch;
   a releasing line connected to said release latch such that pulling on said line moves said lock key away from the lock shoulder of said ring latch.

2. A release for a bull rope which comprises:
   a generally flat base having a top and a bottom and first and second ends;
   a ring latch having a locking end and an open mouth end;
   a first pivot connecting said ring latch to said base, said first pivot having an axis parallel to the plane of said base;
   a latch arm having a first and second end;
   a second pivot connecting said latch arm to said base such that said second end may in one position engage the locking end of said ring latch, the axis of said second pivot being perpendicular to the plane of said base such that the ring latch pivots in a plane substantially perpendicular to the plane in which the latch arm pivots;
   biasing means urging said second end toward said locking end of said ring latch;
   a pull cord attached to said latch arm;
   a D-ring connection at one end of said base.

3. A release as defined in claim 2 in which the mouth of said ring latch extends over said first end of said base, said mouth having a face which slopes outwardly toward the end away from the locking end and makes an angle of A with the longitudinal axis of said ring latch, said angle A being in the range of from about 91° to about 120°.

4. A release as defined in claim 3 in which angle A is about 109°.

* * * * *

UNITED STATES PATENT AND TRADEMARK OFFICE
CERTIFICATE OF CORRECTION

PATENT NO. : 4,909,658

DATED : March 20, 1990

INVENTOR(S) : Blue H. Townsend

Page 1 of 2

It is certified that error appears in the above-identified patent and that said Letters Patent is hereby corrected as shown below:

The title page should be deleted to appear as per attached title page.

Signed and Sealed this

Twenty-second Day of October, 1991

Attest:

*Attesting Officer*

HARRY F. MANBECK, JR.

*Commissioner of Patents and Trademarks*

United States Patent [19]

Townsend

[11] Patent Number: 4,909,658
[45] Date of Patent: Mar. 20, 1990

[54] BULL ROPE RELEASE

[76] Inventor: Blue H. Townsend, 141 Ramblewood Dr., Bartlesville, Okla. 74003

[21] Appl. No.: 318,741

[22] Filed: Mar. 3, 1989

[51] Int. Cl.⁴ .................... A44B 13/00; F16G 11/00
[52] U.S. Cl. .................................. 403/325; 403/316; 403/322; 403/321; 403/330; 24/241 PP; 24/241 SB; 24/242; 24/115 F
[58] Field of Search ............... 403/316, 321, 322, 325, 403/330, DIG. 4; 24/645, 115 F, 241 PP, 241 SB, 242, 599; 292/78, 96, 126, 129, 106; 89/1.58; 410/96, 116

[56] References Cited

U.S. PATENT DOCUMENTS

| | | | |
|---|---|---|---|
| 1,190,383 | 7/1916 | Court | 403/330 X |
| 2,328,914 | 9/1943 | Kubat | 403/DIG. 4 |
| 2,821,003 | 1/1958 | Boyes et al. | 24/645 |
| 4,533,276 | 8/1985 | Stidham | 403/165 |
| 4,820,094 | 3/1989 | Hirakui et al. | 403/322 X |

OTHER PUBLICATIONS

Pro Rodeo Products 1988 Catalog, p. 15.

*Primary Examiner*—Randolph A. Reese
*Assistant Examiner*—Franco S. DeLiguori
*Attorney, Agent, or Firm*—John D. Gassett

[57] ABSTRACT

A quick safety release for bull ropes and bare back riggings. One ring on the bull rope is held to the release device by a first ring latch which is pivoted to a release frame. A pivoted spring-loaded latch arm which in its normal position is perpendicular to the ring latch holds the ring latch in position preventing it from rotating about its pivot. A release line or cord is connected to the latch arm. When the bull rider pulls the release line the latch arm is pulled away from the ring latch permitting it to come unlatched from the ring of the bull rope.

4 Claims, 2 Drawing Sheets